United States Patent Office 2,932,660
Patented Apr. 12, 1960

2,932,660
PROCESS FOR PRODUCING PLATINUM-ALUMINA CATALYST

Michael D. Riordan, Fishkill, Norman D. Carter, Poughkeepsie, and Louis B. Bos, Fishkill, N.Y., assignors to Texaco Inc., a corporation of Delaware No Drawing. Application September 29, 1955
Serial No. 537,563

7 Claims. (Cl. 252—442)

This invention relates to a process for producing catalyst useful in reforming hydrocarbons of the naphtha boiling range, i.e., approximately 0–450° F. More specifically, it relates to an improved process for preparing such catalyst containing platinum deposited on an alumina base.

Heretofore particulate platinum-alumina catalysts have been used for reforming naphtha. In such operation the catalyst tends to become coated with carbon and thereby decline in activity. Certain materials have been suggested for depositing on platinum-alumina catalyst to stabilize such catalyst, i.e., to prolong catalyst activity and/or to permit repeated oxidative regeneration of the catalyst without substantial impairment of its activity. Thus, it has been proposed to stabilize the catalyst by depositing with the platinum an alkaline earth metal oxide, magnesia, or alumina as stabilizing agent on the alumina base particle. The use of an alumina stabilizing agent is especially attractive in such instance because of the identity of stabilizing material and base particle and, therefore, less tendency to alter or impair the finished catalyst or to induce any undesirable effects.

Accordingly, it has been suggested to deposit platinum in a colloidal dispersion on alumina base particles simultaneously with a colloidal hydrated aluminum oxide as a protective colloid for the platinum. Such treatment is believed to inhibit crystal growth of the catalytic metal under service conditions and consequent impairment of catalytic activity. Preparation of colloidal sols must be done with a high degree of care to insure suitably small particle size and uniform particle distribution of the impregnating materials on the base so that the resulting catalyst will have desired activity for naphtha reforming; there is considerable risk of producing batches of catalyst with activity varying substantially from batch to batch.

The nature of our improved process for producing alumina stabilized platinum-alumina reforming catalyst is such that suitable small particle size and uniform distribution of the catalytic and stabilizing materials on the base particles result. As our process involves treating the base particles solely with homogeneous (true) solutions, and as it avoids use of colloidal techniques, there also results simplified material handling, process control and ready reproducibility of catalyst batches, providing that the treatment is conducted in accordance with the following principles: contacting acidified alumina base particles as a solid phase with a homogeneous solution of platinum-providing material in a ratio of solution to solid phase adapted to establish essentially complete saturation of said particles with said solution of platinum-providing material and essentially complete absorption of said solution of platinum-providing material on said acidified base particles; removing at least a portion of the absorbed platinum-providing material solution vehicle from said acidified particles; contacting the resulting particles as a solid phase with a homogeneous solution of an alumina-providing material in a ratio of solution to solid phase adapted to establish essentially complete saturation of said resulting particles with said alumina-providing solution and essentially complete absorption of said alumina-providing solution on said resulting particles; and converting platinum-providing material and alumina-providing material on said resulting particles into platinum and stabilizing alumina.

The platinum-providing material for use in our process is one capable of forming a homogeneous solution in a volatile liquid vehicle which can wet the alumina support and be absorbed thereby. Advantageously, the atmospheric boiling point of such vehicle is between about 100° and about 400° F. Suitable solution vehicles are, for example, water, a lower alkanol such as methanol, ethanol, isopropanol, butanol, amyl alcohol or mixtures of these compounds. Specific platinum-providing materials include chloroplatinic acid, platinic tetrachloride, ammonium chloroplatinate (platinum ammonium chloride), hydrated platinum sulfate and platinum amino complex salts. As the application of platinum-providing materials is done prior to the application of alumina-providing material in our process, one does not run the risk of having undesirable interaction such as double decomposition between the two treating agents which might result in an uncontrolled precipitation of platinum.

The preferred solution vehicle for the platinum-providing material is water and the preferred platinum-providing material is a chloride of platinum. The platinum impregnating solution can be prepared, for example, by drying chloroplatinic acid at temperature between about 200° and about 700° F., dissolving the residue in water and neutralizing the residue solution with ammonia to obtain solution pH between about 7.5 and about 10.

The stabilizing alumina-providing material for use in our process is an aluminum compound convertible to alumina by calcining in the presence of oxygen and capable of forming a homogeneous solution in a volatile solution vehicle which can wet the alumina support and be absorbed thereby. Advantageously, the atmospheric boiling point of such vehicle is between about 100° and about 400° F. Suitable solution vehicles for the alumina-providing material are, for example, water, a lower alkanol as previously described, or mixtures thereof. The preferred solution vehicle in this instance is also water. Suitable alumina-providing materials for use in our process include the nitrate, sulfate, chloride, bromide, iodide, chlorate, bromate, acetate, lactate, or alcoholate of aluminum, preferably aluminum nitrate.

It is especially important in our process to control the dosage of the platinum-providing solution and the alumina-providing solution so that there is obtained from each solution treatment practically complete absorption of the treating solution by the particles and, in the same operation, practically complete saturation of the particles with each of the solutions. The term absorption as used herein with respect to the solutions connotes soaking up (like a sponge), adsorption or other occlusion of the solution by the particles; the term saturation used herein with respect to support particles connotes the limit of absorbing capacity of the particles for the solution at treatment temperature and pressure. Saturation and absorption capacity (ml. of solution per gram of particles) of particular alumina support material for the solution can be determined experimentally by mixing a weighed sample of the dried particles with an excess of treating solution in known volume for an hour under treating conditions, draining the particles, and measuring the drained weight of the particles and the volume of the drainings. Percentage saturation of incompletely saturated particles is 100 times the ratio of actual ml. of solution absorbed per gram of particles to the total absorptive capacity of the particles for the solution in ml. per gram.

If a deficiency of the treating solution is used so that the particles being treated are less than essentially completely saturated (i.e., less than about 80% saturated), uniform deposition of the particular providing material is unlikely to occur and some portion of the body of base particles is likely to become impregnated more heavily than the rest. If an excess of the treating solution is used and the treating solution is not essentially completely absorbed (i.e., more than about 10% of the treating solution initially used remains unabsorbed after treatment) one runs the risk, on the one hand, of washing off solute previously applied to the base and, on the other hand, of applying inconsistent quantities of treating solute to the body of base particles from batch to batch.

When the platinum solution treatment is preformed according to invention principles there results a body of damp impregnated solid particles available for the next step of our operation. Removal of platinum solution vehicle therefrom permits subsequent absorption of the stabilizing alumina-providing solution. Use of essentially dry particles for commencing each solution treatment is preferred for ease of process control. In any case at least 50% removal of the platinum solution vehicle is advisable to obtain effective alumina-providing material absorption. Preferably the platinum solution vehicle, e.g., water, is removed practically completely by heating the damp impregnated particles at temperature about the boiling point of the solution vehicle. Alternatively, the solution vehicle can be removed by other methods such as air drying or vacuum drying. Such procedures render the base particles uniformly and highly absorptive of the alumina-providing solution to follow. However, in the case that removal of the platinum solution vehicle is only, say 90% or less complete, a smaller amount of alumina-providing solution having higher aluminum concentration can be used to deposit the desired amount of alumina on the particles. For efficiency and economy in the practice of our process the treatment of the support particles is done at about room temperature and atmospheric pressure, but higher and lower temperature and pressure can be used if desired, so long as substantial absorption capacity of the particles exists and the treating solution remains in liquid condition.

The support particles used in our process are an acidified highly pure alumina, that is a refined alumina treated with strong mineral acid such as HF, $H_2SO_4$ or HCl. The preferred support is alumina acidified with hydrogen fluoride to have an aluminum fluoride content of broadly about 0.1% to about 1.5% by weight and especially about 0.3–1% by weight. Advantageously, the particles are from about 5 to about 30 mesh size (U.S. Standard screen size) and preferably from about 8 to about 14 mesh size. Specific surface of the support particles, as measured prior to the acidification, can be adjusted, for example, by calcining and/or steaming, broadly between about 10 and about 150 square meters per gram, preferably between about 50 and 75 square meters per gram. Specific surface of the purified, unacidified alumina support is determined by absorption of nitrogen according to the method of Brunnauer, Emmett and Teller in the Journal of the American Chemical Society, volume 60, page 309 and following (1938). When treating dry alumina support particles with the solutions the ratio of solution to alumina support particles used is generally in the range of about 0.6 to about 0.8 ml. of solution per gram of support, preferably about 0.7 ml. per gram of support.

The quantity of stabilizing alumina for overlaying the support should be held between 0.25% and about 5.0% of the finished catalyst weight. Below about 0.25% there appears to be only minor observable stabilizing effects, and above about 5% the activity of the catalyst is impaired appreciably. We have obtained most efficient performance in naphtha reforming using a catalyst containing about 1% stabilizing alumina applied by our method and this proportion is therefore preferred.

Platinum concentration on the finished catalyst is generally within the range of 0.1–1% based on the weight of the finished catalyst and preferably it is about 0.5%. It is, of course, possible to substitute for part of the platinum on the catalyst other similarly catalytically active noble metals, e.g., palladium, rhodium, and/or iridium by using a platinum-providing solution containing an additional solute of one or more of these other noble metals.

Concentration of platinum-providing material and stabilizing alumina-providing material in their respective treating solutions is controlled to be sufficient for depositing the equivalent of about 0.1% to about 1% of platinum metal and 0.25% to 5% of stabilizing alumina on the particles. Concentration of platinum metal in the platinum-bearing solution used generally will be between 0.0014 and 0.025 gram per ml. and preferably between about 0.006 and 0.008 gram per ml.; the concentration of aluminum metal in the stabilizing alumina-providing material solution is generally between about 0.0015 and 0.06 gram per ml. and is preferably between about 0.005 and 0.01 gram per ml.

The base particles bearing platinum-providing material and stabilizing alumina providing material are calcined in the presence of air at temperature from about 800° to about 1200° F., preferably about 900° F. This converts a substantial quantity of the platinum-providing material into metallic platinum and the alumina providing material into a stabilizing deposit of alumina. After calcining, the catalyst can be reduced with hydrogen before use in the reforming of hydrocarbon stocks. Alternatively, the use of a recycle flow of hydrogen in the reforming process can be used to reduce to calcined catalyst in situ.

A specific application of the present catalyst is in a process for reforming a gasoline fraction (having a boiling range within the broad limits of about 175° to about 430° F.) at temperature from 600° to 1000° F. and pressure from 50 to 1000 p.s.i.g. in the presence of hydrogen, i.e., using reforming conditions. The space velocity used in the operation is 0.5 to 10 volumes of liquid hydrocarbon feed per volume of catalyst, and the hydrogen feed used is about 0.5 to 10 moles of hydrogen gas per mole of liquid hydrocarbon feed. The preferred catalyst for such use is an HF-acidified alumina support containing from 0.3 to 1.0% aluminum fluoride based on catalyst weight and having deposited thereon 0.5% platinum and about 1% of stabilizing alumina.

In conventional plant operation of such reforming process a series of fixed bed catalytic reactors are used. The operating temperature is raised gradually from about 875° F. to about 975° F. at the expense of yield to prevent the octane rating of the product from falling below about 5 units and until a predetermined economic break point is reached (at which time catalyst is replaced). Operating pressure, usually about 500 p.s.i.g., is chosen to obtain optimum yield and catalyst life. Higher pressure, e.g., 800 p.s.i.g., is conducive to longer running with a lower yield while lower pressure, e.g., 250 p.s.i.g., is conducive to an increased yield with a shorter catalyst life. Thus, prolonged continuous running of the process at the lower pressure with little drop in product octane rating and good yield is a severe test of catalyst effectiveness and of the operational economy of the process.

Carbon monoxide, lead, hydrogen sulfide, arsenic, sodium and iron in the catalyst or in the feed are to be avoided as they are deleterious to the life and/or activity of the catalyst. Metal contamination is avoided by using high purity support and deposition materials in the manufacture of the catalyst, while carbon monoxide, arsenic, and hydrogen sulfide are avoided by pretreatment of the feed. Hydrogen sulfide also can be removed by scrubbing the recycle gas with suitable absorbents therefor. Frequently disulfide oils from Doctor treatment of hydrocarbon stocks are added to the reforming process feed for promoting catalytic activity. An unusual feature of our catalyst is that no sulfiding of the feed is necessary to enhance catalytic activity.

Additionally, because of the ruggedness of our catalyst, oxidative regeneration thereof in the catalytic reactor to burn carbon deposits off the particles is possible using controlled combustion conditions, e.g., by the method shown in the Oil and Gas Journal, volume 54, No. 9, pages 80–84, wherein combustion is obtained at successively higher temperature levels. Alternatively, the oxygen concentration of the combustion gas mixture and the combustion temperature can be maintained at about 3.5 to 4.5 volume percent and 850–950° F., respectively, until practically all the carbonaceous deposit is burned off the catalyst (as indicated by carbon dioxide content in the effluent gas dropping below about 0.2% by volume).

Removal of hydrogen from the spent platinum-alumina catalyst prior to combustion of the carbon acts to prevent "hot spots" during combustion, thereby making the operation less likely to cause substantial local inactivation of the catalyst. The hydrogen removal can be done at elevated temperature by reducing absolute pressure in the catalyst zone to about 100 mm., of mercury or below. Now we have found that passing normally gaseous olefins such as ethylene, propylene, butylene, or their mixtures, over platinum-alumina reforming catalysts, particularly the instant reforming catalyst, at pressure from about atmospheric to about 300 p.s.i.g., preferably at about atmospheric pressure, and temperature of 600–950° F., preferably about 900° F., is highly effective in removing adsorbed hydrogen from the catalyst preparatory to oxidative regeneration. The method is readily adaptable for use in a refinery wherein gas streams having a high concentration of normally gaseous olefins, preferably ethylene, are available. Flow of olefin used is advantageously between about 100 and 300 volumes per hour per volume of catalyst being treated and is preferably about 170 volumes per hour per volume. The olefin concentration in the gas stream used generally should be above about 60 volume percent and is preferably 90 to 100 volume percent. Olefin flow is discontinued when at least the major part of the adsorbed hydrogen has been removed. Generally hydrogenation of the olefin practically ceases after about 0.5 to 3 hours of operation, and the adsorbed hydrogen has been effectively desorbed. After the olefin treatment and prior to combustion of carbon the olefin-containing catalyst zone is best purged with nitrogen or a nitrogen-carbon dioxide mixture to remove hydrocarbons from the zone.

The following examples show ways in which our invention has been practiced, but are not to be construed as limiting the invention. All percentages are weight percentages unless otherwise indicated, and all temperatures are in degrees Fahrenheit. In Examples 1, 3, and 5, following, the proportions of solution: support particles used in each step of acidifying, platinizing, and depositing of aluminum salt on the particles was such as to obtain with each such solution treatment virtually complete saturation of the particles by the particular treating solution and virtually complete absorption of the particular treating solution by the particles, thereby leaving a body of damp impregnated solid particles for the next operation.

*Example 1.*—Solid alumina support of 8–14 mesh size, designated by the trade name Alcoa F–10 and analyzing mainly as gamma alumina with typical impurities of 0.1% $Na_2O$, 0.1% $SiO_2$, and 0.05% $Fe_2O_3$, was calcined at 1500° for 16 hours. The heat-treated support having specific surface of 70 square meters per gram was acidified as follows: 500 grams of the calcined alumina (converted mainly to what was identified as kappa alumina) was mixed thoroughly with 3.36 grams of 47% HF in 350 ml. of water, and the mixture was allowed to stand overnight. A solution of platinum-providing material was prepared as follows: 31.6 ml. of a platinum solution containing 0.1186 gram of $H_2ClPt \cdot 6H_2O$ per ml. was evaporated to dryness and maintained at about 212° overnight. The dried residue, a chloride of platinum, was dissolved in 300 ml. of water and solution pH was adjusted to 9.2 by addition of 24 ml. of an aqueous solution containing 5.78% of ammonium hydroxide.

The neutralized platinum-providing solution was then thoroughly mixed with and absorbed by the HF-treated alumina, the platinum-laden alumina dried at about 212° and left on a steam plate overnight, and the dry solid further impregnated with a solution of 9.38 grams of $Al(NO_3)_3 \cdot 9H_2O$ in 350 ml. of water. The impregnated solid was again dried at about 212° with stirring and calcined at 910° for 3 hours. There was obtained 507 grams of catalyst composed of 98.94% alumina support containing 0.5% $AlF_3 \cdot \frac{1}{2}H_2O$ and having deposited thereon an intimate mixture of 0.3% platinum and 0.26% of stabilizing alumina.

*Example 2.*—Straight run naphtha fuel was reformed by passing it in vapor phase in the presence of hydrogen over the catalyst of Example 1. The reforming operation was conducted at temperature of 875° and pressure of 250 p.s.i.g., using space velocity of 3 volumes of liquid hydrocarbon per volume of catalyst and a hydrogen recycle rate of 8000 cubic feet per barrel of liquid hydrocarbon feed. For the first 61.5 hours of operation the naphtha feed used had the following characteristics: Octane No., ASTM research, clear 57; aromatics, 21 volume percent; gravity, 54.4° API and boiling range of 177–370°. Thereafter, for more than 200 hours the naphtha feed used had the following characteristics: Octane No., ASTM research, clear 55.2; aromatics, 21 volume percent; gravity, 53.5° API, and boiling range of 180–375°. Liquid reaction products were collected and stabilized by distilling off $C_4$ and lighter hydrocarbons. Table I, below shows tests on the $C_5+$ product taken at various intervals during the reforming operation.

*Table I*

| Running time, hours | Yield, $C_5+$weight Percent of charge | Gravity, ° API | Aromatics, Volume Percent | Octane No., ASTM research, clear |
|---|---|---|---|---|
| 1.5–13.5 | 91.7 | 48.8 | 47 | 82.6 |
| 49.5–61.5 | 95.2 | 48.4 | 47 | 82.3 |
| 97.5–109.5 | 96 | 47.8 | 46 | 80.9 |
| 145.5–157.5 | 96.1 | 48.1 | 46 | 80.6 |
| 193.5–205.5 | 95.5 | 48.2 | 45 | 80.0 |
| 241.5–253.5 | 95.9 | 48.5 | 44 | 80.0 |

*Example 3.*—Alcoa F–10 alumina support particles of 8–14 mesh size were calcined as described in Example 1. The support, having specific surface of 58 square meter per gram, was acidified as follows: 500 grams of the calcined alumina were mixed thoroughly with 5.6 grams of 47% HF in 350 ml. of water, and the mixture was allowed to stand overnight. A solution of platinum-providing material was prepared as follows: 52.6 ml. of a platinum solution containing 5.94 grams of $H_2PtCl_6 \cdot 6H_2O$ was evaporated to dryness and maintained at about 212° overnight. The dried residue, a chloride of platinum, was dissolved in 300 ml. of water and the solution pH was adjusted to 8.8 by addition of 29 ml. of an aqueous solution containing 5.78% of ammonium hydroxide.

The neutralized platinum-providing solution was then thoroughly mixed with and absorbed by the HF-treated alumina, the platinum-laden alumina dried at about 212°, and the dry solid impregnated with a solution of 37 grams of $Al(NO_3)_3 \cdot 9H_2O$ in 350 ml. of water. The impregnated solid was again dried at about 212° and calcined at 910° for three hours. There was obtained 508 grams of catalyst composed of 97.67% alumina support containing 0.83% AlF$_3$·½H$_2$O and having deposited thereon an intimate mixture of 0.5% platinum and 1.0% of stabilizing alumina.

*Example 4.*—Straight run naphtha fuel was reformed using the catalyst of Example 3 under the same controlled conditions as described in Example 2. Table II, below, described the feed stocks used successively in the extended operation.

Table II

| Operating Time, Hours | Octane No., ASTM research, clear | Aromatics, Volume Percent | Gravity, °API | Boiling Range |
| --- | --- | --- | --- | --- |
| 0-86 | 55.2 | 21 | 53.5 | 180-375 |
| 86-326 | 56.6 | 21 | 53.9 | 177-375 |
| 326-458 | 55.8 | 21 | 53.7 | 179-380 |
| 458-602 | 57.6 | 21 | 54 | 170-364 |
| 602 to end | 58 | 21 | 53.9 | 173-372 |

Liquid reaction products were collected and stabilized as described in Example 2. Table III, below, shows tests on the C$_5$+ product taken at various intervals during the reforming operation. The excellent stability of the catalyst is shown by these tests wherein the catalyst remained highly active for more than 800 hours.

Table III

| Running Time, Hours | Yield, C$_5$+ Weight Percent of charge | Gravity, °API | Aromatics, Volume Percent | Octane No., ASTM research, clear |
| --- | --- | --- | --- | --- |
| 2-14 | 93.6 | 47 | 51 | 85.4 |
| 38-50 | 95.1 | 47.3 | 49 | 83.5 |
| 86-98 | 94.8 | 48 | 49 | 83.5 |
| 82-194 | 94.9 | 47.9 | 48 | 83.1 |
| 278-290 | 95.0 | 48.3 | 47 | 83.0 |
| 326-338 | 93.4 | 48.4 | 47 | 81.1 |
| 422-434 | 95.6 | 48.7 | 45 | 80.8 |
| 470-482 | 95.2 | 48.8 | 45 | 80.7 |
| 590-602 | 95.7 | 48.9 | | 81.4 |
| 614-626 | 95.9 | 49.1 | 43 | 80.1 |
| 806-818 | 96.7 | 49.6 | 41 | 79 |

In a similar run under the same conditions using unstabilized platinized, HF-treated alumina catalyst (0.3% Pt) the octane rating of the product dropped from 80.9 to 74 in 458 hours.

*Example 5.*—471 grams of calcined Alcoa F-10 alumina support particles of 8-14 mesh size, having specific surface of 58 square meters per gram, were acidified with 5.70 grams of 47% HF in 300 ml. of water and allowed to stand overnight. A solution of platinum-providing material was prepared as follows: 58.6 ml. of a platinum solution containing 6.65 grams of H$_2$PtCl$_6$·6H$_2$O were evaporated to dryness on a steam plate and left thereon overnight; the residue was dissolved in 300 ml. of water and the solution pH adjusted to 8.95 by addition of 29 ml. of aqueous solution containing 5.78% of ammonium hydroxide. This solution was thoroughly mixed with and absorbed by the acidified alumina particles which were then dried on a steam plate. The dried particles were mixed with a solution of 184 grams of Al(NO$_3$)$_3$·9H$_2$O in 300 ml. of water. The impregnated solid was again dried at about 212° F. with stirring, then calcined at 910° F. for three hours. There was obtained 500 grams of a brown product containing 0.83 percent AlF$_3$·½H$_2$O and having deposited thereon an intimate mixture of 0.5% of platinum and 5% of stabilizing alumina.

A straight run naphtha fuel was reformed using this catalyst and the same operating conditions as Example 2. Characteristics of the naphtha feed were as follows: Octane No., ASTM research, clear, 45; aromatics, 12 volume percent; gravity 54.4° API; and boiling range of 228-378. Liquid reaction products were collected and stabilized as described in Example 2. Table IV, below, shows tests on the C$_5$+ product taken at various intervals during the reforming operation.

Table IV

| Running Time, Hours | Yield, C$_5$+ Weight Percent of charge | Gravity, °API | Aromatics, Volume Percent | Octane No., ASTM research, clear |
| --- | --- | --- | --- | --- |
| 2-14 | 93.7 | 48.6 | 42 | 73.1 |
| 74-86 | 97.1 | 48.9 | 41 | 72.2 |
| 290-302 | 93.4 | 49.6 | 39 | 71.1 |

*Example 6.*—Each of a pair of 100 ml. portions of catalyst, made by the method shown in Example 3, above, was subjected to a series of cycles consisting of a period of reforming motor naphtha with the catalyst portion and a period of accelerated coking of the catalyst portion. After each coking period the catalyst was regenerated as hereinafter described, the first portion by method A and the second portion by method B. The feed used during the reforming and coking steps of each cycle was a motor naphtha having ASTM research clear octane number of 46.4 and ASTM distillation range from 224° to 352° F. Each reforming period for each catalyst portion lasted 12 hours at 250 p.s.i.g. and 875° F. using space velocity of three volumes of naphtha feed per hour per volume of catalyst and a hydrogen recycle feed of 8000 s.c.f.h. per barrel of naphtha feed. The coking period for each portion lasted 12 hours at 150 p.s.i.g. and 975° F. using the same naphtha space velocity and a hydrogen recycle feed of 3000 s.c.f.h. per barrel of naphtha feed.

In regeneration method A, 0.6 s.c.f.h. of ethylene was passed over the catalyst at about atmospheric pressure and 900° F. for two hours, then 3.5 s.c.f.h. of a gas consisting of 3.75 volume percent oxygen and 96.25 volume percent nitrogen was passed over the catalyst at 900° F. and atmospheric pressure to burn off carbon deposits. When CO$_2$ concentration in the effluent gas from the combustion operation went below 0.15 volume percent, combustion was discontinued in preparation for the next reforming period. In the burning operation flame front temperature was below 1000° F. and nominal bed temperature was about 900° F. Method B consisted of burning off the carbon with an oxygen-nitrogen mixture in the same way as the second step of method A. Table V, below, shows the ASTM research clear octane number of the C$_5$+ products (stabilized as in Example 2) produced from the motor naphtha feeds after the second, third and fourth regenerations of the catalyst by methods A and B, respectively.

Table V

| Method | Octane Rating | | |
| --- | --- | --- | --- |
| | After 2nd Regeneration | After 3rd Regeneration | After 4th Regeneration |
| A | 70.6 | 69.2 | 69.4 |
| B | 70.0 | 67.8 | 64.9 |

Obviously, many modifications and variations of the invention, as hereinbefore set forth may be made without departing from the spirit and scope thereof and therefore only such limitations should be imposed as are indicated in the appended claims.

We claim:
1. A process for producing stabilized platinum-alumina reforming catalyst which comprises contacting mineral acid-treated alumina particles with a homogeneous solution of platinum-providing material in a ratio of platinum-providing material solution to acid-treated alumina particles adapted to establish essentially complete saturation of said acid-treated alumina particles with said solution of platinum-providing material and essentially complete absorption of said solution of platinum-providing material on said acid-treated alumina particles; removing at least a portion of the absorbed platinum-providing material solution vehicle from said platinum-treated alumina particles; contacting the resulting particles with a homogeneous solution of an alumina-providing material in a ratio of alumina-providing material solution to said resulting particles adapted to establish essentially complete saturation of said resulting paritcles with said alumina-providing solution and essentially complete absorption of said alumina-providing solution on said resulting particles; and converting platinum-providing material and alumina-providing material on said resulting particles into platinum and stabilizing alumina.

2. The process of claim 1 wherein said mineral acid-treated particles are HF-treated alumina particles having aluminum fluoride content between about 0.1 and 1.5% by weight.

3. A process of claim 2 wherein the solution of platinum-providing material is an aqueous solution of a chloride of platinum having concentration sufficient for depositing the equivalent of 0.1% to 1% of platinum metal, based on weight of finished catalyst, on said mineral acid-treated alumina particles; and the solution of alumina-providing material is an aqueous solution of aluminum nitrate in concentration sufficient for depositing the equivalent of 0.25% to 5% of stabilizing alumina, base on weight of finished catalyst, on said resulting particles.

4. A process for producing stabilized platinum-alumina reforming catalyst which comprises: forming acid-treated alumina particles containing 0.1–1.5% by weight aluminum fluoride by treating alumina particles having specific surface between 50 and 75 square meters per gram with aqueous hydrogen fluoride; essentially completely saturating the acid-treated alumina particles with a quantity of homogeneous solution of platinum-providing material adapted to obtain practically complete absorption of said platinum-providing solution on said particles; at least partially drying the resulting platinized alumina particles, thereby rendering them responsive to additional absorption of liquid; essentially completely saturating the platinized alumina particles with a quantity of a homogeneous solution of an alumina-providing material adapted to obtain practically complete absorption of said alumina-providing solution on said platinized alumina particles; and converting the deposited platinum-providing material into elemental platinum and the deposited alumina-providing material into stabilizing alumina.

5. A process for producing stabilized platinum-alumina reforming catalyst which comprises contacting mineral acid-treated alumina particles with a homogeneous solution of platinum-providing material, said platinum-providing material being selected from the group consisting of chloroplatinic acid, platinic tetrachloride, ammonium chloroplatinate, hydrated platinum sulfate and platinum amino complex salts; in a ratio of platinum-providing material solution to acid-treated alumina particles adapted to establish essentially complete saturation of said acid-treated alumina particles with said solution of platinum-providing material and essentially complete absorption of said solution of platinum-providing material on said acid-treated alumina particles; removing at least a portion of the absorbed platinum-providing material solution vehicle from said platinum-treated alumina particles; contacting the resulting particles with a homogeneous solution of an alumina-providing material; said alumina-providing material being selected from the group consisting of aluminum nitrate, aluminum sulfate, aluminum chloride, aluminum bromide, aluminum iodide, aluminum chlorate, aluminum bromate, aluminum acetate, aluminum lactate and aluminum alcoholate in a ratio of alumina-providing material solution to said resulting particles adapted to establish essentially complete saturation of said resulting particles with said alumina-providing solution and essentially complete absorption of said alumina-providing solution on said resulting particles; and converting platinum-providing material and alumina-providing material on said resulting particles into platinum and stabilizing alumina.

6. Process as claimed in claim 5, wherein removal of the absorbed platinum-providing material solution vehicle from the platinum-treated alumina particles is carried out by heating said particles and thereby evaporating at least a portion of said solution vehicle.

7. A process for producing alumina stabilized platinum-alumina reforming catalyst which comprises contacting mineral acid-treated alumina particles with a homogeneous aqueous solution of platinum-providing material in a ratio of platinum providing material solution to acid-treated alumina particles adapted to establish essentially complete saturation of said acid-treated alumina particles with said aqueous solution of platinum-providing material and essentially complete absorption of said aqueous solution of platinum-providing material on said acid-treated alumina particles; drying the resulting particles at a temperature of about 212° F. to effect removal of at least a portion of the absorbed platinum-providing material solution vehicle from said platinum-treated alumina particles; contacting the resulting particles with a homogeneous aqueous solution of an alumina-providing material in a ratio of alumina-providing material solution to said resulting particles adapted to establish essentially complete saturation of said resulting particles with said aqueous solution of alumina-providing material and essentially complete absorption of said aqueous solution of alumina-providing material on said resulting particles; drying the particles at about 212° F. and calcining the dried particles whereby the deposited platinum-providing material and the deposited alumina-providing material are converted into platinum and stabilizing alumina.

References Cited in the file of this patent

UNITED STATES PATENTS

| | | |
|---|---|---|
| 2,611,736 | Haensel | Sept. 23, 1952 |
| 2,635,080 | Appell | Apr. 14, 1953 |
| 2,667,461 | Guyer et al. | Jan. 26, 1954 |
| 2,689,226 | Hoekstra | Sept. 14, 1954 |
| 2,752,289 | Haensel | June 26, 1956 |
| 2,758,063 | MacLaren et al. | Aug. 7, 1956 |
| 2,764,528 | Sweeney | Sept. 25, 1956 |
| 2,840,527 | Brennan et al. | June 24, 1958 |